United States Patent
Froeschle

(10) Patent No.: US 8,944,464 B2
(45) Date of Patent: Feb. 3, 2015

(54) ARRANGEMENT FOR A MOTOR VEHICLE

(71) Applicant: Dr. Ing. h.c. F. Porsche Aktiengesellschaft, Stuttgart (DE)

(72) Inventor: Mathias Froeschle, Ostfildern (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/132,239

(22) Filed: Dec. 18, 2013

(65) Prior Publication Data

US 2014/0167397 A1    Jun. 19, 2014

(30) Foreign Application Priority Data

Dec. 18, 2012   (DE) .......................... 10 2012 112 538

(51) Int. Cl.
*B60R 21/13* (2006.01)
(52) U.S. Cl.
CPC ...................................... *B60R 21/13* (2013.01)
USPC ....................................................... 280/756

(58) Field of Classification Search
USPC ......................................................... 280/756
See application file for complete search history.

(56) References Cited

U.S. PATENT DOCUMENTS

| 7,198,294 | B2 * | 4/2007 | Welch ........................... 280/756 |
| 7,407,188 | B2 * | 8/2008 | Wildig et al. ................. 280/756 |
| 7,416,214 | B2 * | 8/2008 | Hermann et al. ............. 280/756 |
| 7,690,684 | B2 * | 4/2010 | Tobaru et al. ................ 280/756 |
| 7,717,461 | B2   | 5/2010 | Beierl et al. |
| 8,419,062 | B2 * | 4/2013 | Landini et al. ............... 280/756 |

FOREIGN PATENT DOCUMENTS

| DE | 10 2008 031 835 A | 1/2010 |
| EP |      2 343 222 A1 | 9/2010 |

* cited by examiner

*Primary Examiner* — Drew Brown
(74) *Attorney, Agent, or Firm* — Gerald E. Hespos; Michael J. Porco; Matthew T. Hespos

(57) ABSTRACT

A motor vehicle has a cover module (4) formed from a brittle material and a rollover hoop (10) in a passive position below the cover module (4). The rollover hoop (10) moves to an active position in a rollover and breaks through at least the cover module (4).

12 Claims, 1 Drawing Sheet

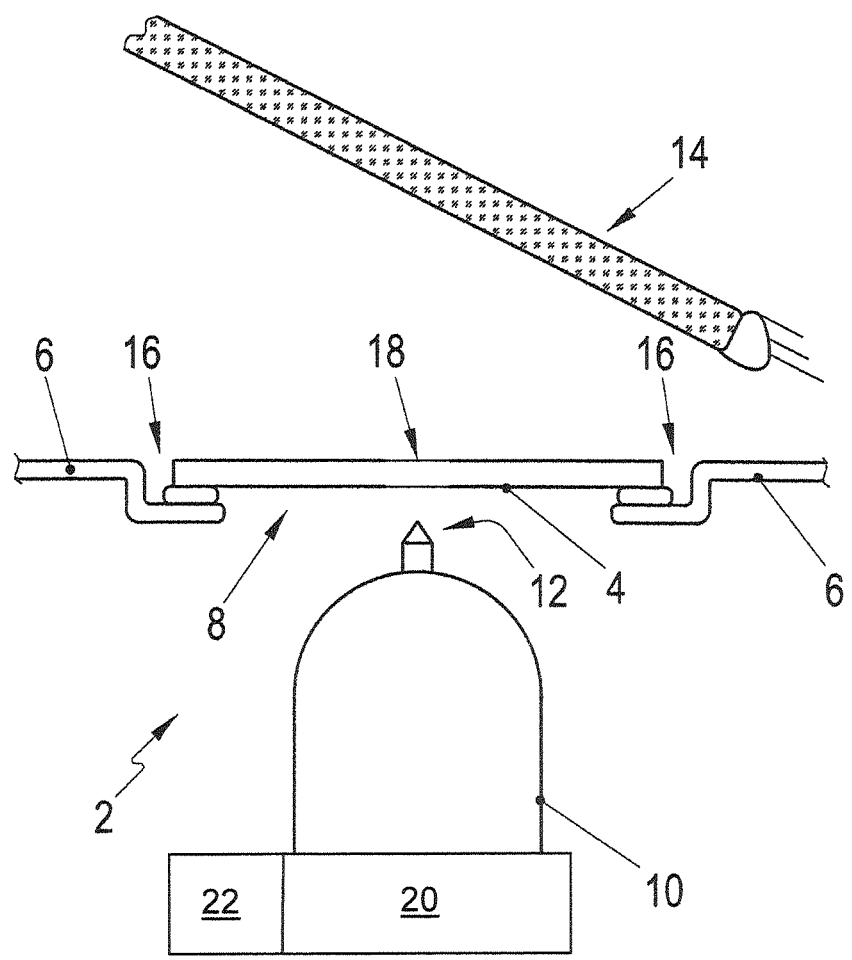

ARRANGEMENT FOR A MOTOR VEHICLE

CROSS REFERENCE TO RELATED APPLICATION

This application claims priority under 35 USC 119 to German Patent Appl. No. 10 2012 112 538.4 filed on Dec. 18, 2012, the entire disclosure of which is incorporated herein by reference.

BACKGROUND

1. Field of the Invention

The invention relates to an arrangement with a cover module and a roll over hoop for a motor vehicle. The invention also relates to a method for operating a rollover hoop of a motor vehicle.

2. Description of the Related Art

U.S. Pat. No. 7,717,461 relates to a motor vehicle having a roof arrangement that can be moved between a closed position and an open position and that has a roof skin. At least one rollover protection element is stored under a cover when in a retracted rest position (RS). However, the rollover protection element can be moved into a deployed protective position (AS) while displacing the cover. The rollover protection element has a manipulation element that can penetrate through the roof skin to reach the protective position (AS). A contact structure is provided on an underside of the cover facing toward the rollover protection element and prevents contact of the manipulation element with the cover to achieve a reliable deployment of the rollover protection element.

U.S. Pat. No. 7,407,188 discloses a rollover hoop arrangement for a motor vehicle. The rollover hoop arrangement comprises a deployable rollover hoop with a pin that projects from a top side of the deployable rollover hoop to break a rear window of the vehicle during a deployment of the rollover hoop.

U.S. Pat. No. 7,198,294 describes a motor vehicle having a deployable rollover hoop with a projecting pin on an upper surface of the rollover hoop and with a first and a second decorative part. The first decorative part is fastened on the motor vehicle to support a second decorative part that comprises a cover for an upper section of the rollover hoop and that is movable relative to the motor vehicle. The pin is received in an opening and at least one spring-loaded, circular clip surrounds the upper section of the rollover hoop. The clip is braced by the relative position of the first second decorative parts. The upper section moves toward the second decorative part during deployment of the rollover hoop until the pin projects through the opening and the spring clip is relaxed. Thereafter the clip becomes clipped around the rollover hoop and the cover moves onward with the rollover hoop to a rear window of the vehicle.

SUMMARY OF THE INVENTION

The arrangement for a motor vehicle comprises a deployable rollover hoop and a cover module arranged above the rollover hoop as a cover. The cover module is composed of a brittle material, for example a glass, which in one embodiment is in the form of a single-pane safety glass. The cover module may be fastened in and/or on a paneling of the motor vehicle, normally in an interior or passenger compartment of the motor vehicle. The cover module, however, also may be mounted in the exterior region, for example in a lid, a tailgate or some other body part.

The arrangement may be used for a cabriolet (convertible) motor vehicle with a movable top that temporarily covers the interior of passenger compartment when the top is in a closed position. The interior or passenger compartment is uncovered and thus roofless if the top is in an open position. Consequently, the top can be a temporary roof for the interior or passenger compartment.

The cover module is designed to cover an opening of the cover or of the paneling, below which the rollover hoop is arranged. The cover module is adhesively bonded into, plugged into, screwed into and/or connected by some other fastening means to the opening. Thus, the cover module is connected fixedly to an adjacent paneling part and/or body part of the motor vehicle, for example, to a top compartment cover.

The rollover hoop has at least one glass-breaker pin or at least one glass-breaking spike on a top side. A glass-breaker pin or glass-breaking spike normally is formed as a component of an emergency hammer which, for example in public transportation vehicles or in buildings, can be used to break through and thus destroy glass or window panes.

The rollover hoop must be moved from a passive position into the active position when the motor vehicle, generally a cabriolet, is in a dangerous situation and is in the process of rolling over, or is at risk of rolling over, for example in the event of an accident. The dangerous situation in which there is the risk of the motor vehicle rolling over can be identified by a position sensor. The position sensor provides a signal in a dangerous situation and activates a mechanism for moving the rollover hoop from the passive position into the active position in fractions of a second, for example by means of an explosive charge.

Deployment of the rollover hoop from the passive position into the active position causes the top side of the rollover hoop to penetrate, break through and/or destroy the cover module, generally by the at least one glass-breaking spike that is arranged on the top side.

Further movement of the rollover hoop causes the top side of the rollover hoop to penetrate or break through a rear window that may be arranged above the cover module. This is the case inter alia when the top of a cabriolet motor vehicle is closed.

The rollover hoop reaches its active position and thus a required deployment height after the rollover hoop has penetrated the cover module and the rear window that may be arranged above the cover module.

The cover module preferably is fastened to the paneling in the interior compartment of the motor vehicle. Thus, the cover module is not a movable flap that is pivoted open relative to an opening of the paneling by means of a hinge arrangement when acted on by the rollover hoop.

If the cover module is not arranged in the interior compartment but rather is arranged for example behind the closed top in a body component, the cover module is incorporated so as to impart a sealing action with respect to the adjacent body component. This is more advantageous than a flap.

The cover module preferably is composed of a brittle material that shatters immediately, and thus imparts only little resistance to the moving rollover hoop, when impacted by the hard, sharp glass-breaking spike during a movement of the rollover hoop into the active operating position. A single-pane safety glass can be used as the brittle material of the cover module and will break down into small glass fragments without pointed or sharp edges.

The cover module, if manufactured from glass, may have a dark tint, such as a black tint, so that the rollover hoop is not visible when in the passive position below the cover module.

Accordingly, the cover module may have a special coloring or etching and may be utilized as a design element. However, the cover module also may be transparent so that the rollover hoop is visible in its passive operating position.

The cover module may be formed from a brittle material other than glass, such as a brittle plastic or a brittle metal that exhibits fracture behavior similar glass.

Further advantages and embodiments of the invention will emerge from the description and from the appended drawing. The features mentioned above and the features explained below may be used in the specified combination, in other combinations or individually without departing from the scope of the invention.

BRIEF DESCRIPTION OF THE DRAWINGS

FIG. 1 is a schematic illustration of one embodiment of an arrangement according to the invention.

DETAILED DESCRIPTION OF THE PREFERRED EMBODIMENTS

FIG. 1 illustrates an arrangement 2 for a motor vehicle that has a cover module 4 in the form of a brittle glass pane. The cover module 4 is fastened to an edge region of a panel 6 that borders an opening 8 so that the cover module 4 covers the opening 8. The invention could be applied to body components other than a panel.

At least one fastening element 16 in the form of an adhesive bond and/or weld is arranged between the panel 6 and the cover module 4 and fastens the cover module 4 to the edge region of the panel 6. The fastening element 16 alternatively or additionally may take the form of screws, rivets and/or clips.

A rollover hoop 10 is arranged below the panel 6 and the cover module 4 and is shown in a passive position in the illustration of FIG. 1. A glass-breaking spike 12 is arranged on a top side of the rollover hoop 10 and has a tapered and/or conical tip oriented toward the cover module 4. The glass-breaking spike 12 is made of a hard and/or hardened material, for example metal.

FIG. 1 also shows a rear window 14 of the motor vehicle, which, in this case, is a cabriolet. The rear window 14 is a component of a movable top of the cabriolet.

The cover module may be arranged outside the top with no rear window situated above the cover module.

The cover module 4 of the arrangement 2 covers the rollover hoop 10 when the rollover hoop 10 is in the passive position. The cover module 4 is connected fixedly to the panel 6 of the motor vehicle and covers an opening of the panel 6, below which the rollover hoop 10 is arranged when in the passive position.

The rollover hoop 10 is designed to break through and destroy the cover module 4 when moving from the passive position to the active position. For this purpose, the rollover hoop 10 is moved by a mechanism 20 that is activated when the motor vehicle rolls over or is at risk of rolling over, which may be identified by a position sensor 22.

Furthermore, the rollover hoop 10 is designed to break through the rear window 14 after breaking through the cover module 4 during movement from the passive position to the active position if the rear window is arranged above the cover module.

The cover module 4 may have a dark tint. The at least one glass-breaking spike 12 on the top of the rollover hoop 10 is designed to shatter the cover module 4 when the rollover hoop 10 moves from the passive position into the active position.

The cover module 4 may also have a predetermined breaking point 18 arranged above the glass-breaking spike 12 on the top of the rollover hoop 10, as shown in FIG. 1. The predetermined breaking point 18 in the cover module 4 is provided as an option and may be omitted in other embodiments.

The cover module 4 covers the rollover hoop 10 when the rollover hoop 10 is in the passive position below the cover module 4, The cover module 4 is composed of the brittle material and is broken through and/or shattered during the movement of the rollover hoop 10 from the passive position to the active position.

A distance between the glass-breaking spike 12 and the predetermined breaking point 18 when the rollover hoop 10 is arranged in the passive operating position below the cover module 4 may range from a few millimeters to a few decimeters. When the rollover hoop 10 is moved from the passive position into the active position, the glass-breaking spike 12 is moved along a normally straight path. The predetermined breaking point 18 is arranged along this path. The glass-breaking spike 12 impacts directly against the predetermined breaking point 18 and breaks through the cover module 4 at the predetermined breaking point 18 when the rollover hoop 10 is moved from the passive position into the active position.

The glass-breaking spike 12 on the top of the rollover hoop 10 breaks through the cover module 4 and can continue through the rear window 14 above the cover module 4 as the rollover hoop 10 moves from the passive position to the active position.

What is claimed is:

1. An arrangement for a motor vehicle, comprising: a body panel having an opening therein; a cover module formed from a brittle material and having an outer periphery connected and sealed to the body panel around a periphery of the opening; and a rollover hoop disposed in the opening in the body panel and movable from a passive position below the cover module to an active position sufficiently above the passive position to shatter the cover module.

2. The arrangement of claim 1, wherein the panel is in an interior compartment of the motor vehicle.

3. The arrangement of claim 1, wherein the rollover hoop is formed from a material to break through the cover module during a movement from the passive position into the active position.

4. The arrangement of claim 3, wherein the cover module is arranged below a rear window of the motor vehicle.

5. The arrangement of claim 4, wherein movement of the rollover hoop from the passive position to the active position is sufficient to break through the rear window after breaking through the cover module.

6. The arrangement of claim 3, in which the cover module is composed of a material with a Mohs hardness of greater than or equal to 5.

7. The arrangement of claim 3, wherein the cover module is glass.

8. The arrangement of claim 7, wherein the cover module is made of safety glass.

9. The arrangement of claim 3, wherein the cover module has a sufficiently dark tint so that the rollover hoop is not visible when in the passive position.

10. The arrangement of claim 3, wherein the cover module is transparent.

11. The arrangement of claim 3, further comprising at least one glass-breaking pin on a top side of the rollover hoop for breaking through the cover module when the rollover hoop moves into the active position.

12. The arrangement of claim 1, wherein the motor vehicle is a cabriolet with an openable roof, and wherein the opening in the body panel is exposed at an exterior position of the motor vehicle at least when the roof of the cabriolet is open.

* * * * *